Oct. 27, 1959      C. A. LINGARD      2,909,926

APPARATUS FOR DETECTING TEMPERATURE CHANGES

Filed Jan. 21, 1955

United States Patent Office 2,909,926
Patented Oct. 27, 1959

2,909,926

APPARATUS FOR DETECTING TEMPERATURE CHANGES

Cyril Alwyn Lingard, Offerton, Stockport, England, assignor to John Morris & Sons (Detectors) Limited, Salford, England Application January 21, 1955, Serial No. 483,314

2 Claims. (Cl. 73—362)

This invention has reference to apparatus for detecting temperature changes and has for its object to provide apparatus, preferably portable, which can be used for testing the temperature of the surface and the interior of stacked goods, or the temperature of bearings or moving parts where over-heating may occur, the apparatus being housed in a box which can be carried on shoulder slings and easily carried by the user but which may also be in a fixed position, if desired, either permanently or temporarily.

According to the present invention, apparatus for detecting temperature changes comprises a Wheatstone bridge circuit having on one side the usual two branches in series including each a fixed resistor and permanently connected across the galvanometer and connected at their junction point to one side of the voltage source, and having on the other side two alternative pairs of series connected branches with switching means to connect them selectively across the galvanometer and simultaneously connect their junction points respectively to the other side of the voltage source, one branch of each pair having a temperature responsive resistor and the other branch of each pair having a comparison resistor one of which is temperature responsive and the other of which is not temperature responsive. For example each branch in one pair of said series connected branches contains a nickel resistor one of which is standard and the other of which is temperature responsive and is portable for probing purposes, and the other pair contains a constant resistance in one branch unaffected by temperature, such as a standard constantan resistor, and a resistor in the other branch which is sensitive to temperature, such as a platinum resistor, and is portable for probing purposes. Thus with the first or nickel probe comparison is made between the temperature at the temperature responsive resistor and the ambient air surrounding the standard resistor, while the other or platinum probe can be used to measure the actual temperature.

Such apparatus, with the exception of the temperature responsive resistance elements, may conveniently be housed in a box or container having a socket into which the temperature responsive resistance elements may be plugged.

Figure 1:
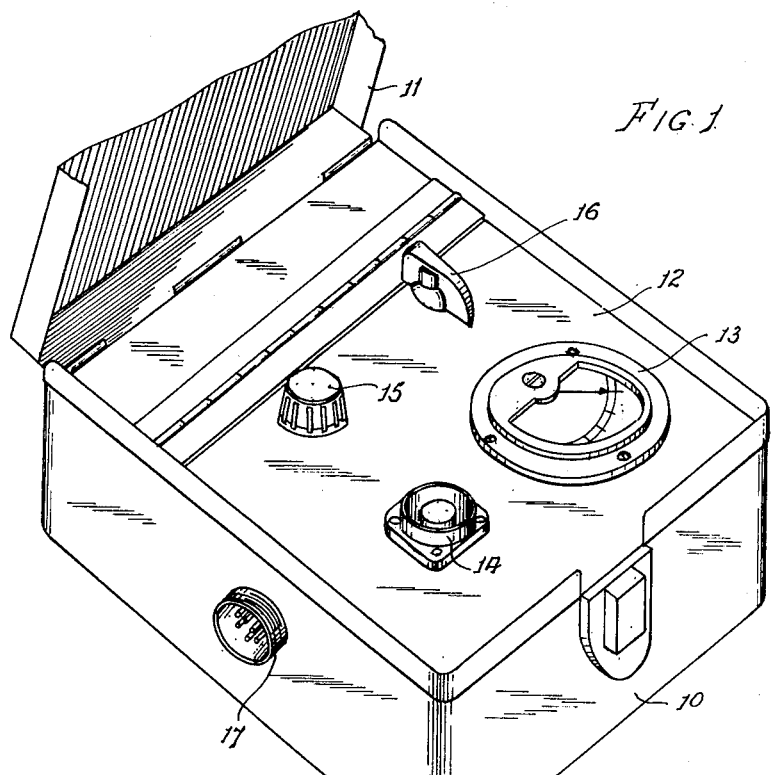
Figure 2:
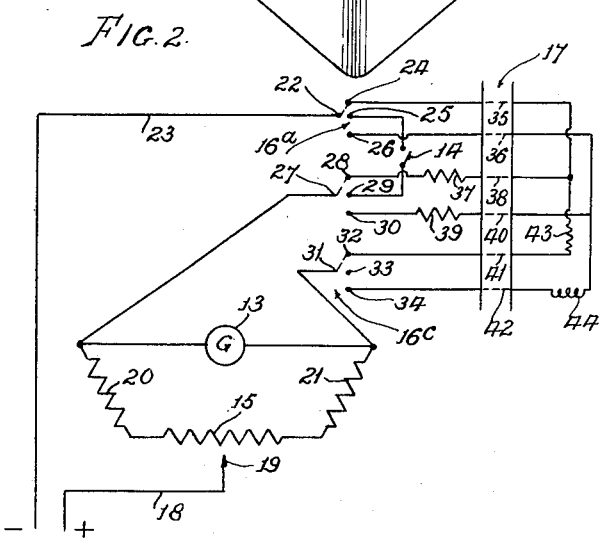

The invention will be described further, by way of example, with reference to the accompanying drawings in which:

Fig. 1 is a perspective view of a practical form of testing apparatus according to the invention; and Fig. 2 is a circuit diagram of the apparatus.

The testing apparatus comprises a box or housing 10 having a hinged lid 11 which opens to reveal an instrument panel 12 on which are mounted a galvanometer 13, a press-button testing switch 14, a variable resistance 15 and an on/off and selector switch 16. Within the housing 10 are mounted a number of resistances and all the electrical elements are connected to a D.C. source of current and to a socket 17, the circuit being illustrated in Fig. 2.

A source of current is indicated by the usual plus and minus symbols in the circuit, and a positive lead 18 therefrom is connected to the movable contact 19 of the variable resistance 15, the ends of which latter are connected respectively through fixed wire-wound resistances 20 and 21, to the terminals of the galvanometer 13.

The switch 16 of Fig. 1 is, in effect, a composite switch and comprises three simultaneously actuated three-way switches which are designated 16a, 16b, and 16c in Fig. 2. A terminal 22 of the switch 16a is connected by negative lead 23 to the battery and the terminal 22 can be switched to make circuit with any one of three terminals 24, 25, and 26. Similarly, the terminal 27 of switch 16b can be connected to any one of the three terminals 28, 29 or 30 and the terminal 31 of switch 16c can be connected to any one of the three terminals 32, 33 or 34. The arrangement is such that all three switches 16a, 16b and 16c are simultaneously operated. When the switch 16a bridges terminals 22 and 24, switch 16b is bridging terminals 27 and 28 and switch 16c is bridging terminals 31 and 32, as illustrated. If the switch 16a is moved to bridge terminals 22 and 25, the switch 16b moves to bridge terminals 27 and 29 and switch 16c is moved to an "off" position bridging terminals 31 and 33, the terminal 33 having no connection thereto. When the switch 16a is moved to bridge terminals 22 and 26, the switches 16b and 16c bridge the terminals 27 and 30, and 31 and 34 respectively.

As will be evident from Fig. 2, the terminal 24 is connected to a pin 35 of the socket 17, the terminal 25 is connected through the push-button switch 14 to the terminal 29 of switch 16b, and terminal 26 is connected to a pin 36 of the socket 17. In switch 16b, the terminal 28 is connected through a standard nickel resistance 37 to a third pin 38 of the socket 17, and the terminal 30 is connected through a fixed constantan resistance 39 to a fourth pin 40 of the socket. In switch 16c, the terminals 32 and 34 are respectively connected to fifth and sixth pins 41 and 42 of the socket 17.

Separate from the housing of Fig. 1 are two detectors or probes, which are indicated at the right of the socket 17 in Fig. 2. These probes, which may be included in a single unit if desired, comprise a nickel temperature-responsive resistance 43 which is connected at one side to the pins 35 and 38 and at the other side to the pin 41 of the socket, and a platinum temperature responsive resistance 44 which is connected at one side to the pins 36 and 40 and the other side to the pin 42 of the socket 17.

The operation of the circuit will be evident from the foregoing description. Normally the switch 16 will be in a position where the terminals 22 and 25, 27 and 29, and 31 and 33 are bridges so that the battery is open circuited at switch 14 and no current flows. To check that correct current is available, the switch 14 can be depressed to close the circuit directly through the galvanometer 13, which latter may conveniently be calibrated to indicate the potential of the battery. If the nickel temperature-responsive resistance 43 is to be used, then the switch 16 is turned so that the terminals are bridged in the manner illustrated in the drawings. The fixed resistance 37 and the temperature-responsive resistance 43 are then connected across the galvanometer 13 and to the negative lead 23 from the battery so forming one alternative or duplicated arm of a Wheatstone bridge circuit.

If the platinum temperature-responsive resistance 44 is to be used, the switch 16 is turned so that terminals 22 and 26, 27 and 30, and 31 and 34 are bridged, and the constantan resistance 39 and the temperature-responsive platinum resistance form a second alternative or duplicated arm of the Wheatstone bridge circuit.

In practice, the nickel temperature-responsive resistance 43 and its leads are preferably incorporated in a first probe adapted to be plugged into the socket 17, and the platinum temperature-responsive resistance 44 will be incorporated in a second probe which can only be plugged into the socket 17 as an alternative to the first probe.

The first probe will be employed for surface temperature testing and will indicate the difference between the ambient temperature of the box 10 and the temperature at the probe. The box 10 and the probe can then be carried around a stack or pile of material and when applied to the surface to be tested will, if heat be present, show a deflection at the galvanometer, which latter can be graduated if desired. The variable resistance 15 if used, of course, is adjusted before testing commences to zero the galvanometer.

The second probe will be used with the switch 16 in its appropriate position as previously described, for indicating actual temperature at the platinum temperature responsive resistance 44, and the galvanometer 13 will correspondingly be graduated in degrees, as desired. For ascertaining the temperature, for example in the centre of a stack such as a haystack, the probe is forced into the stack until the resistance is disposed at the desired position, whereupon any increase in resistance thereof due to heat in the stack will cause a corresponding deflection of the galvanometer.

I claim:

1. As an apparatus for detecting temperature changes, a Wheatstone bridge circuit comprising a galvanometer, two branches in series connected across the galvanometer and constituting one side of the circuit, a fixed resistance in each branch, a voltage source having one side connected to the junction point of the two branches, two alternative pairs of series connected branches each connectable across the galvanometer to constitute the other side of the circuit, a temperature responsive resistance in one branch of each pair, a temperature responsive resistance in the other branch of one pair, a constant resistance in the other branch of the other pair, switching means operative in one position to connect one of the alternative pairs of branches across the galvanometer and in another position to connect the other one of the alternative pairs of branches across the galvanometer, and supplemental switching means operative simultaneously with the switching means to connect the other side of the voltage source to the junction points of the individual branches of the respective pairs of branches as they are alternatively connected across the galvanometer.

2. As an apparatus for detecting temperature changes, a Wheatstone bridge circuit as defined in claim 1 in which said switching means is operative in a third position to connect the other side of the voltage source directly to one side of the galvanometer.

References Cited in the file of this patent

UNITED STATES PATENTS

| | | |
|---|---|---|
| 1,444,771 | Baker | Feb. 13, 1923 |
| 1,460,530 | Brown et al. | July 3, 1923 |
| 1,724,469 | Ghadiali | Aug. 13, 1929 |
| 2,098,650 | Stein | Nov. 9, 1937 |
| 2,131,065 | Obermaier | Sept. 27, 1938 |
| 2,649,715 | Goble | Aug. 25, 1953 |
| 2,711,650 | Weisheit | June 28, 1955 |